324-77 CROSS REFERENCE SEARCH ROOM
SOUND RECOGNITION APPARATUS
Filed March 10, 1967
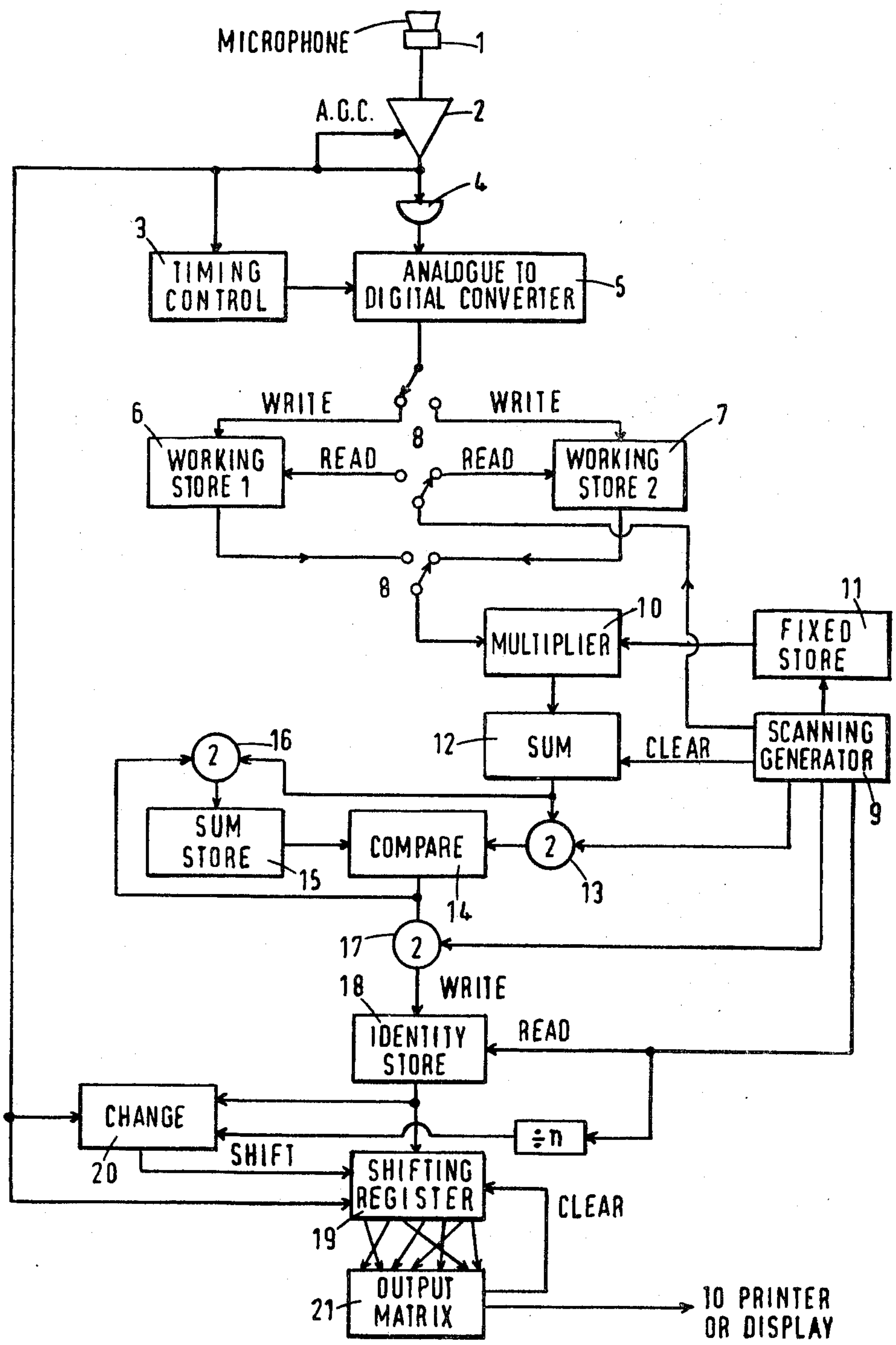

United States Patent Office 3,541,259

Patented Nov. 17, 1970

3,541,259

SOUND RECOGNITION APPARATUS

William Dudley Gilmour, Glastonbury, England, assignor to Electric & Musical Industries Limited, Hayes, Middlesex, England, a company of Great Britain Filed Mar. 10, 1967, Ser. No. 622,326
Claims priority, application Great Britain, Mar. 16, 1966, 11,423/66
Int. Cl. G10l 1/00
U.S. Cl. 179—1 6 Claims

ABSTRACT OF THE DISCLOSURE

Sound recognition apparatus comprising means for deriving from the voice an input signal representing the sound waveform and including successive cycles of the voicing frequency, means for testing the input signal for identification of it, and means for controlling the operation of the testing means in dependence upon the voicing instants of the voice by sampling the amplitude of the input signal at predetermined times within each voicing cycle to render the tests less dependent than would otherwise be the case on variations in the voicing frequency.

The present invention relates to apparatus capable of recognizing spoken information, and is especially but not exclusively suited to the operation of a phonetic typewriter or as an input device for a computer.

An object of the present invention is to provide sound recognition apparatus which is less influenced by changes of basic pitch of the voice of a given speaker or by variations of basic pitch and other parameters of the voice from speaker to speaker than such apparatus as has been proposed hitherto.

According to the present invention there is provided sound recognition apparatus comprising, (a) means for deriving from the voice an input signal representing the sound waveform and including successive cycles of the voicing frequency, (b) means for testing said input signal for identification of said sound waveform, including (c) means for deriving from said input signal a plurality of samples of the amplitude of said input signal within each of said cycles, (d) means for causing said samples to be taken at a succession of predetermined times after a voicing instant and within the cycle following said instant and (e) means for comparing said samples with signals representing corresponding samples of known sound waveforms.

In the following specification reference will be made to phonemes. A phoneme may be considered to be one of the minimum set of shortest segments in a spoken language, which after substituting one for another changes the sound of one word into the sound of another word. Phonemes are distinctive features which are portions of syllables and different phonemes may be represented by different phonetic symbols. The term "sub-phoneme" will also be used in the specification, and can be taken as that part of an utterance which correlates strongly with neighbouring parts of the utterance for successive periods of the fundamental frequency of the vocal chords or voicing frequency. The vocal chords produce voicing impulses at successive times termed the voicing instants, at a repetition frequency termed the voicing frequency. It has been found that a man speaking naturally has a voicing frequency of about 110 to 140 cycles per second and a woman has a voicing frequency of 220 to 280 cycles per second.

The apparatus of the present invention seeks to overcome the frequency disparity between different voices by comparing portions of the waveform in cycles of the voicing frequency between successive voicing instants with similar portions of the waveforms of known speech sounds. A voicing instant is the instant at which a cycle of the voicing frequency begins. From one comparison with stored sub-phonemes the identities of the sub-phonemes contributing to a phoneme are produced and, taken in correct order, are used the select the appropriate output coding for application to a phonetic printer or computer, as required.

In order that the invention may be fully understood and readily carried into effect, it will now be described with reference to the accompanying drawing a single figure which shows in diagrammatic form one example of apparatus according to the present invention.

Referring to the drawing the apparatus consists of a microphone 1 into which the speaker speaks and the output signal from which is applied to amplifier 2 fitted with automatic gain control to normalise the level of the output signal. The output signal of the amplifier 2 is applied to a timing control circuit 3 and via a delay output 4 to an analogue to digital converter 5. The timing control circuit 3 responds to the peak level of the envelope of the input waveform to determine the time of a voicing instant and this provides a succession of spaced output pulses at predetermined times relative to the voicing instant which pulses are applied to the analogue to digital converter 5 to derive from the input waveform a number of samples, each at an instant determined by the pulses from the circuit 3, and the converter 5 produces the digital codes representative of the amplitude of the waveform at the sampling instants.

The code combinations produced by the converter 5 are applied alternately to the working stores 6 and 7, a switch 8 being provided so that whilst one store is receiving information from the converter 5 the other store is being interrogated. The data stored in the working store being interrogated is read under the control of signals from a scanning generator 9 and the signals so produced which represent the samples of the input waveform are applied to a multiplier 10 where they are individually multiplied by respective signals representing samples of known waveforms from a fixed store 11, which stores the combinations of coded samples corresponding to standard sub-phoneme waveforms. A summing circuit 12 is provided to total the products from corresponding samples of a sub-phoneme from a working store 6 or 7 and a sub-phoneme from the fixed store 11. The output of the summing circuit 12 represents the degree of correlation between the input sub-phoneme in the working store and the particular sub-phoneme selected from the fixed store by the scanning generator 9. The scanning generator 9 selects all of the sub-phonemes from the fixed store 11 in turn and forms in the summing circuit 12 the correlation coefficients of each input sub-phoneme from the working store with every sub-phoneme in the fixed store. The total from the summing circuit 12 is applied via gate 13 under the control of a signal from the generator 9 to a comparison circuit 14 where the total is compared with the total stored in a store 15. If the output from the gate 13 exceeds that from the store 15 the comparison circuit 14 produces an output signal which causes the total from the summing circuit 12 to be entered via the gate 16 into the sum store 15 to replace the total already in it. At the same time as the gate 16 is opened by the comparison circuit 14, a gate 17 is opened to pass a signal from the scanning generator 9 to an identity store 18. The signal from the generator 9 is indicative of the identity of the one of the sub-phonemes being read from the fixed store 11 at the time and when applied to the store 18 replaces the identity stored in it. Thus at the end of each series of correlations the identity of the sub-phoneme from the fixed store 11 showing the greatest correlation to the particular one from the working store 6 or 7 will be stored in the identity store 18.

At the end of a series of correlations that is after a cycle of the fixed store 11, the identity of the sub-phoneme is transferred from the identity store 18 to the shifting register 19 where the successive sub-phoneme identities are shifted along under the control of signals from the change detector unit 20. After a period of time the register 19 stores side by side the identities of a number of sub-phonemes, and when a change or momentary break occurs in the output of the amplifier 2 the register 19 produces an output representing the combination of identities. The combinations of sub-phonemes corresponding to known phonemes are built into an output matrix 21 which produces an output signal representing the known phoneme corresponding to the combination of sub-phonemes from the register 19 to a printer or other utilisation circuit. The matrix 21 also clears the shifting register 19 when the output signal is produced.

The change detector 20 shifts the data stored in the register 19 whenever a change occurs in the output of the amplifier 2 or the identity store 18 or after *n*, say three, successive identical outputs from the store 18.

Amplitude normalisation is achieved by a conventional rapid acting A.G.C. circuit, with an operate slope of about 20 db/ms. and a recovery slope of perhaps 1 db/ms. In addition to the normal rapid acting A.G.C. the amplifier 2 may also include a further A.G.C. circuit having a slow decay time constant of about five seconds to reduce the range of control required of the rapid A.G.C. to accommodate quiet speakers and loud speakers. The total range should be of the order of 40 db for the rapid A.G.C. with a further 20 db for the slow A.G.C. adequate for normal conversational speech. The DC and AC levels of A.G.C. are both of importance in the further processing, so that the amplifier should have a well defined gain/control voltage characteristic. It may be of benefit to use some transfer characteristic other than linear in the amplifier which characteristic may be determined experimentally, however a linear characteristic may also be used.

The basic interval, that between successive voicing instants, coincides with the period of the fundamental frequency of the vocal chords (i.e. 110–140 c./s.) for men; for women there are two alternatives, to operate at 220–280 c./s. and use half the number of time quantisations, or to use a revised main store and take two fundamental cycles as input. Sinec the actual formant frequencies do not differ as much as the basic frequency, the second alternative is preferred, but initially only male voices will be considered. For unvoiced phonemes, for example those corresponding to "S" or "th" as in "this," the time interval is arbitrary and one channel can be used for both voiced and unvoiced utterances. It has been found that most of the information necessary to distinguish voiced utterances is concentrated in the first 5 ms. after the voicing instant, and accordingly after each voicing instant, detected as a peak in the envelope of the waveform, the waveform is sampled a number of times in the ensuing 5 milliseconds, although, of course, the sampling may if desired, be spread over the entire interval from one voicing instant to the next. An advantage of using the shorter interval for sampling is that more time is left for analysing the samples. However, whichever method is chosen, the analogue-to-digital converter takes 64 samples, uniformly spaced within the interval chosen. The sampling pulse generator for the analogue to digital converter produces 64 sampling pulses in each interval. The converter itself is conventional, quantising into a sign bit and three signal bits, giving 7 levels on either side of zero. This unit feeds into the stores 6 and 7, each of which holds 256 bits (4×64). These may be switched over as shown in the figure or one store could always be being loaded, and the other analysed, at the changeover the loaded store could discharge its contents into the analyser store very quickly and then resume loading the next sample. A circulation rate during analysis of about 640 kc./s. is required.

The fixed store 11 contains information on approximately 100 standard sub-phonemes, quantised similarly to the information in the working stores. A parallel output of bit information is required, and although a 25,600 bit core store could be built, it would be possible to use a cathode ray tube type of store using four tubes (one for each bit of a sample) with 64 bits in a line and 100 lines scanned by a common generator. With this relatively coarse pattern, no registration difficulties with the associated masks should be encountered.

The comparator multiplies the individual pattern bits from each of the stored patterns with the corresponding bits from the working sample sequentially, i.e. each complete pattern is sequentially sampled. The sum of each series of multiplications is examined. If it is greater than any of the previous sums of the present analysing cycle, it is stored in 15 and the corresponding line's identification is stored in 18. In this way at the end of a run through the comparison with all the stored patterns, the identity of that having the highest coefficient of correlation with the working sample will be available in the store 18. This code is passed to the phoneme recognition circuit comprising components 19, 20 and 21.

The sub-phoneme recognition circuit depends on different voices producing correlatable outputs for the same sub-phoneme. The time over which the correlation is to be made is of the greatest importance, for not even the same voice will correlate with another sample of itself over an indefinite period. For inflected speech the time of correlation should be reduced. This will not affect the overall design of the equipment, because fewer samples in this period will be needed, the maximum sampling frequency remaining at about 6.4 kc./s. The use of 100 sub-phonemes allows a certain amount of redundancy in the choice of matching sub-phonemes some of which could be allocated to a given sub-phoneme to allow for differing individual voices. The combined choice of the number of sub-phonemes and the sampling rate sets the overall comparison frequency of 640,000 comparisons (or four bit multiplications and summings) per second. The internal bit rate of the multiplier, etc. can be as high as 10 mc./s. without difficulty, thus allowing the working store to cycle as slowly as possible at about 640 kc./s.

As described above the phoneme recognition is essentially deterministic in character but any adaptive circuits can be added to the sub-phoneme recognition unit; for example, the contents of the fixed store 11 can be entered by adaptive techniques.

The sub-phoneme recognising circuits deliver to the phoneme recognising circuits a signal representing the best fit found between the input speech and the stored sub-phoneme patterns, at a rate of about 100/s. Phonemes which do not alter during their phonation (stationary phonemes) will have a single sub-phoneme identification during their phonation, and in this case the sub-phoneme and phoneme identification coincide. Nonstationary sub-phonemes will however show a pattern of sub-phonemes, which are typical of the given phoneme. The actual duration of the sub-phoneme will be of importance in the transient consonants, but, not, generally, in voiced sub-phonemes. A phoneme in general will contain not more than three sub-phonemes, although there will be cases, because of the sampling method chosen, where a repetitive pattern of sub-phonemes will occur and the whole pattern may be required for identification. (A rolled "r" is an example). It is therefore proposed that the sub-phoneme pattern should be stored in the shift register 19, moving on once for every change of sub-phoneme, or, if the sub-phoneme appears to represent a stationary phoneme, for every third sample. As soon as a likely phoneme has been identified from the contents of the shift register, the latter is cleared and the identified phoneme displayed. Additional data inputs to the shift register 19 come from the DC and AC A.G.C. levels, suitably quantised.

A satisfactory relatively cheap output printer suitable for receiving the output signals of the apparatus would be a "golfball" typewriter, which is fast, and will not be damaged by conflicting inputs. A standard typewriter of this construction, modified with solenoids on the keys is satisfactory, for one of the major features of this typewriter is that it possesses a type of mechanical store, in that if two keys are sequentially depressed in a shorter time than the cycling time of the machine, the information from the second depression is effectively stored, to be released when the first character has been printed. This feature would be of the greatest value in dealing with two phonemes in rapid succession, as it avoids any other form of output buffer. A type ball with the ITA symbols, for example, may be used, or alternatively the Shaw alphabet characters may be used. More complex output printers, such as might be used for a computer print-out may alternatively be used.

What I claim is:

1. Sound recognition apparatus comprising,
(a) means for deriving from the voice an input signal representing the sound waveform and including successive cycles of the voicing frequency,
(b) means for testing said input signal for identification of said sound waveform, including
(c) means for deriving from said input signal a plurality of samples of the amplitude of said input signal within each of said cycles,
(d) means for causing said samples to be taken at a succession of predetermined times after a voicing instant and within the cycle following said instant, and
(e) means for comparing said samples with signals representing corresponding samples of known sound waveforms.

2. Apparatus according to claim 1 including
(a) a store for representations of identified waveforms between voicing instants, and
(b) wherein said testing means includes means for selecting series of representations from the store occurring in intervals between suitable changes of said input signal, and
(c) means for producing indications of the sound waveforms represented by said input signal over each of said intervals in response to each series of selected representations.

3. Apparatus according to claim 2 including means for producing an indication of the identity of the sound waveform represented by the input signal over one of said intervals when a given number of the selected representations are the same.

4. Sound recognition apparatus comprising
(a) means for deriving from the voice an input signal representing the sound waveform and including successive cycles of the voicing frequency,
(b) means for testing said input signals for identification of said sound waveform, including
(c) means for deriving from said input signal a plurality of samples of the amplitude of said input signal within each of said cycles,
(d) means for causing said samples to be taken at a succession of predetermined times after a voicing instant and within the cycle following said instant,
(e) means for comparing said samples with signals representing corresponding samples of known sound waveforms,
(f) said means for comparing including means for multiplying said samples with respective values of said signals representing the known sound waveforms, and
(g) means for summing the products so produced.

5. Apparatus according to claim 4 including
(a) a store for representations of identified waveforms between voicing instants, and
(b) wherein said testing means includes means for selecting series of representations from the store occurring in intervals between suitable changes of said input signals, and
(c) means for producing indications of the sound waveforms represented by said input signal over each of said intervals in response to each series of selected representations.

6. Apparatus according to claim 5 including means for producing an indication of the identity of the sound waveform represented by the input signal over one of said intervals when a given number of the selected representations are the same.

References Cited

UNITED STATES PATENTS

| | | | |
|---|---|---|---|
| 2,708,688 | 5/1955 | Kalfaian | 179—1 |
| 2,646,465 | 7/1953 | Davis et al. | |
| 2,685,615 | 8/1954 | Biddulph et al. | |
| 3,036,268 | 5/1962 | Smith | 179—1 |

KATHLEEN H. CLAFFY, Primary Examiner

C. JIRAUCH, Assistant Examiner

U.S. Cl. X.R.

324—77